(12) United States Patent
Shkalim et al.

(10) Patent No.: US 10,290,087 B2
(45) Date of Patent: May 14, 2019

(54) METHOD OF GENERATING AN EXAMINATION RECIPE AND SYSTEM THEREOF

(71) Applicant: Applied Materials Israel Ltd., Rehovot (IL)

(72) Inventors: Ariel Shkalim, Sede-Gat (IL); Moshe Amzaleg, Beer Sheva (IL); Eyal Neistein, Herzliya (IL); Shlomo Tubul, Modiin (IL); Mark Geshel, Kfar-Saba (IL); Elad Cohen, Beer Sheva (IL)

(73) Assignee: APPLIED MATERIALS ISRAEL LTD., Rehovot (IL)

( * ) Notice: Subject to any disclaimer, the term of this patent is extended or adjusted under 35 U.S.C. 154(b) by 0 days.

(21) Appl. No.: 15/701,371

(22) Filed: Sep. 11, 2017

(65) Prior Publication Data

US 2019/0080447 A1    Mar. 14, 2019

(51) Int. Cl.
*G06K 9/00* (2006.01)
*G06T 7/00* (2017.01)
*G06T 7/11* (2017.01)

(52) U.S. Cl.
CPC .............. *G06T 7/0002* (2013.01); *G06T 7/11* (2017.01); *G06T 2207/30168* (2013.01)

(58) Field of Classification Search
CPC .... G06T 7/0002; G06T 7/11; G06T 2207/30168
USPC ..................................................... 382/180
See application file for complete search history.

(56) References Cited

U.S. PATENT DOCUMENTS

| | | | |
|---|---|---|---|
| 2007/0280527 A1 | 12/2007 | Almogy et al. | |
| 2008/0250384 A1* | 10/2008 | Duffy | G03F 7/70525 716/55 |
| 2009/0220142 A1* | 9/2009 | Matsushita | G06K 9/4604 382/149 |
| 2010/0074516 A1* | 3/2010 | Kawaragi | G01N 21/956 382/149 |
| 2011/0286657 A1* | 11/2011 | Yamada | G06T 7/001 382/149 |
| 2013/0204569 A1 | 8/2013 | Goren et al. | |
| 2017/0206650 A1* | 7/2017 | Kulkarni | G06T 7/0006 |
| 2017/0357895 A1* | 12/2017 | Karlinsky | G06N 3/08 |
| 2018/0268099 A1* | 9/2018 | Katzir | G06F 17/5081 |

* cited by examiner

*Primary Examiner* — Van D Huynh
(74) *Attorney, Agent, or Firm* — Lowenstein Sandler LLP

(57) ABSTRACT

There are provided system and method of generating an examination recipe usable for examining a specimen, the method comprising: capturing images from dies and obtaining noise map indicative of noise distribution on the images; receiving design data representative of a plurality of design groups each having the same design pattern; calculating a group score for each given design group, the group score calculated based on the noise data associated with the given design group and a defect budget allocated for area of the given design group; providing segmentation related to the dies, comprising: associating design groups with segmentation labels indicative of different noise levels based on the group score, thereby obtaining a set of die segments each corresponding to one or more design groups associated with the same segmentation label and segmentation configuration data; and generating an examination recipe using the segmentation configuration data.

20 Claims, 5 Drawing Sheets

METHOD OF GENERATING AN EXAMINATION RECIPE AND SYSTEM THEREOF

TECHNICAL FIELD

The presently disclosed subject matter relates, in general, to the field of examination of a specimen, and more specifically, to methods and systems of generating an examination recipe usable for examining a specimen.

BACKGROUND

Current demands for high density and performance associated with ultra large scale integration of fabricated devices require submicron features, increased transistor and circuit speeds, and improved reliability. As semiconductor processes progress, pattern dimensions such as line width, and other types of critical dimensions, are continuously shrunken. This is also referred to as the design rule. Such demands require formation of device features with high precision and uniformity, which, in turn, necessitates monitoring of the fabrication process, including frequent and detailed inspections of the devices while they are still in the form of semiconductor wafers, including both finished devices and/or unfinished devices.

The term "specimen" used in this specification should be expansively construed to cover any kind of wafer, masks, and other structures, combinations and/or parts thereof used for manufacturing semiconductor integrated circuits, magnetic heads, flat panel displays, and other semiconductor-fabricated articles.

Unless specifically stated otherwise, the term "examination" used in this specification should be expansively construed to cover any kind of detection and/or classification of defects in an object. Examination is provided by using, e.g., non-destructive examination tools during or after manufacture of the object to be examined. By way of non-limiting example, the examination process can include scanning (in a single or in multiple scans), sampling, reviewing, measuring, classifying and/or other operations provided with regard to the object or parts thereof, using one or more examination tools. Likewise, examination can be provided prior to manufacture of the object to be examined and can include, for example, generating an examination recipe(s). It is noted that, unless specifically stated otherwise, the term "examination" or its derivatives used in this specification are not limited with respect to the size of the inspected area(s), to the speed or resolution of the scanning or to the type of examination tools. A variety of non-destructive examination tools includes, by way of non-limiting example, optical tools, scanning electron microscopes, atomic force microscopes, etc.

Examination process can include a plurality of examination steps. During the manufacturing process, the examination steps can be performed a multiplicity of times, for example after the manufacturing or processing of certain layers, or the like. Additionally or alternatively, each examination step can be repeated multiple times, for example for different wafer locations or for the same wafer locations with different examination settings.

By way of non-limiting example, run-time examination can employ a two-step procedure, e.g. inspection of a specimen followed by review of sampled defects. During the inspection step, the surface of a specimen or a part thereof (e.g. areas of interest, hot spots, etc.) is typically scanned at relatively high-speed and/or low-resolution. The captured inspection image is analyzed in order to detect defects and obtain locations and other inspection attributes thereof. At the review step the images of at least part of defects detected during the inspection phase are, typically, captured at relatively low speed and/or high-resolution, thereby enabling classification and, optionally, other analyses of at least part of defects. In some cases both phases can be implemented by the same inspection tool, and, in some other cases, these two phases are implemented by different inspection tools.

Examination generally involves generating some output (e.g., images, signals, etc.) for a wafer by directing light or electrons to the wafer and detecting the light or electrons from the wafer. Once the output has been generated, defect detection is typically performed by applying defect detection method and/or algorithm to the output. Most often, the goal of examination is to provide high sensitivity to defects of interest while suppressing detection of nuisance and noise on the wafer.

There is a need in the art for improving the sensitivity of defect detection.

GENERAL DESCRIPTION

In accordance with certain aspects of the presently disclosed subject matter, there is provided computerized system of generating an examination recipe usable for examining a specimen, the system comprising: an examination tool configured to capture one or more images from one or more dies of the specimen and obtain noise map indicative of noise distribution on the one or more images; an I/O interface configured to receive design data of the one or more dies, the design data representative of a plurality of design groups each corresponding to one or more die regions having the same design pattern; and a processing unit operatively connected to the examination tool and the I/O interface, the processing unit comprising a memory and a processor operatively coupled thereto, wherein the processing unit is configured to: calculate a group score for each given design group, wherein the noise map is aligned with the design data such that each given design group of the plurality of design groups is associated with noise data within the die regions corresponding to the given design group, and wherein the group score is calculated based on the noise data associated with the given design group and a defect budget allocated for area of the given design group; provide segmentation related to the one or more dies, comprising: associating each given design group with one segmentation label of a predefined set of segmentation labels indicative of different noise levels based on the group score of the given design group, thereby obtaining a set of die segments each corresponding to one or more design groups associated with the same segmentation label and segmentation configuration data informative of the segmentation; and generate an examination recipe using the segmentation configuration data.

In addition to the above features, the system according to this aspect of the presently disclosed subject matter can comprise one or more of features (i) to (xvii) listed below, in any desired combination or permutation which is technically possible:

(i). The processing unit can be further configured to register the design data with the noise map such that the noise map is aligned with the design data.

(ii). The noise map can be indicative of statistical noise distribution on a plurality of images captured from a plurality of dies of at least the specimen.

(iii). The noise distribution can comprise one or more noise characteristics of noises indicated in the noise map including locations of the noises.
(iv). The noise distribution can comprise one or more noise characteristics of noises indicated the noise map including locations of the noises and at least one of the following: strength and size of the noises.
(v). Noises indicated in the noise map can comprise pattern-related noise.
(vi). The noise map can comprise information related to planted defects, the planted defects being simulated defects added to the one or more images in predefined locations associated with a design pattern of interest (POI). The group score of a given design group comprising the design POI can be calculated based on the information of planted defects.
(vii). The examination tool can be an inspection tool configured to scan the specimen to capture the one or more images with sensitive examination configuration and the noise map can be obtained using a low detection threshold.
(viii). The group score can be a threshold calculated by applying the defect budget allocated for the given design group on a noise histogram created based on the noise data associated with the given design group.
(ix). The calculating can be further based on overlapping between the plurality of design groups.
(x). The predefined set of segmentation labels can be indicative of noise levels of quiet, noisy and very noisy.
(xi). The segmentation configuration data can be used to configure a detection threshold for each die segment.

In accordance with another aspect of the presently disclosed subject matter, there is provided a computerized method of generating an examination recipe usable for examining a specimen, the method comprising: capturing, by an examination tool, one or more images from one or more dies of the specimen and obtaining noise map indicative of noise distribution on the one or more images; receiving, by an I/O interface, design data of the one or more dies, the design data representative of a plurality of design groups each corresponding to one or more die regions having the same design pattern; calculating, by a processing unit operatively connected to the inspection unit and the I/O interface, a group score for each given design group, wherein the noise map is aligned with the design data such that each given design group of the plurality of design groups is associated with noise data within the die regions corresponding to the given design group, and wherein the group score is calculated based on the noise data associated with the given design group and a defect budget allocated for area of the given design group; providing, by the processing unit, segmentation related to the one or more dies, comprising: associating each given design group with one segmentation label of a predefined set of segmentation labels indicative of different noise levels based on the group score of the given design group, thereby obtaining a set of die segments each corresponding to one or more design groups associated with the same segmentation label and segmentation configuration data informative of the segmentation; and generating, by the processing unit, an examination recipe using the segmentation configuration data.

This aspect of the disclosed subject matter can comprise one or more of features (i) to (xi) listed above with respect to the system, mutatis mutandis, in any desired combination or permutation which is technically possible.

In accordance with another aspect of the presently disclosed subject matter, there is provided a non-transitory computer readable storage medium tangibly embodying a program of instructions that, when executed by a computer, cause the computer to perform a method of generating an examination recipe usable for examining a specimen, the method comprising: obtaining one or more images from one or more dies of the specimen and obtaining noise map indicative of noise distribution on the one or more images; receiving design data of the one or more dies, the design data representative of a plurality of design groups each corresponding to one or more die regions having the same design pattern; calculating a group score for each given design group, wherein the noise map is aligned with the design data such that each given design group of the plurality of design groups is associated with noise data within the die regions corresponding to the given design group, and wherein the group score is calculated based on the noise data associated with the given design group and a defect budget allocated for area of the given design group; providing segmentation related to the one or more dies, comprising: associating each given design group with one segmentation label of a predefined set of segmentation labels indicative of different noise levels based on the group score of the given design group, thereby obtaining a set of die segments each corresponding to one or more design groups associated with the same segmentation label and segmentation configuration data informative of the segmentation; and generating an examination recipe using the segmentation configuration data.

This aspect of the disclosed subject matter can comprise one or more of features (i) to (xi) listed above with respect to the system, mutatis mutandis, in any desired combination or permutation which is technically possible.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "capturing", "receiving", "calculating", "aligning", "providing", "associating", "generating", "obtaining", "registering", "scanning", "using", "applying", "configuring", or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the computerized system of generating an examination recipe and parts thereof as well as the processing unit therein disclosed in the present application.

The terms "non-transitory memory" and "non-transitory storage medium" used herein should be expansively construed to cover any volatile or non-volatile computer memory suitable to the presently disclosed subject matter.

The term "defect" used in this specification should be expansively construed to cover any kind of abnormality or undesirable feature or void formed on or within a specimen.

The term "design data" used in the specification should be expansively construed to cover any data indicative of hierarchical physical design (layout) of a specimen. Design data can be provided by a respective designer and/or can be derived from the physical design (e.g. through complex simulation, simple geometric and Boolean operations, etc.). Design data can be provided in different formats as, by way of non-limiting examples, GDSII format, OASIS format, etc. Design data can be presented in vector format, grayscale intensity image format or otherwise.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

Figure 1:
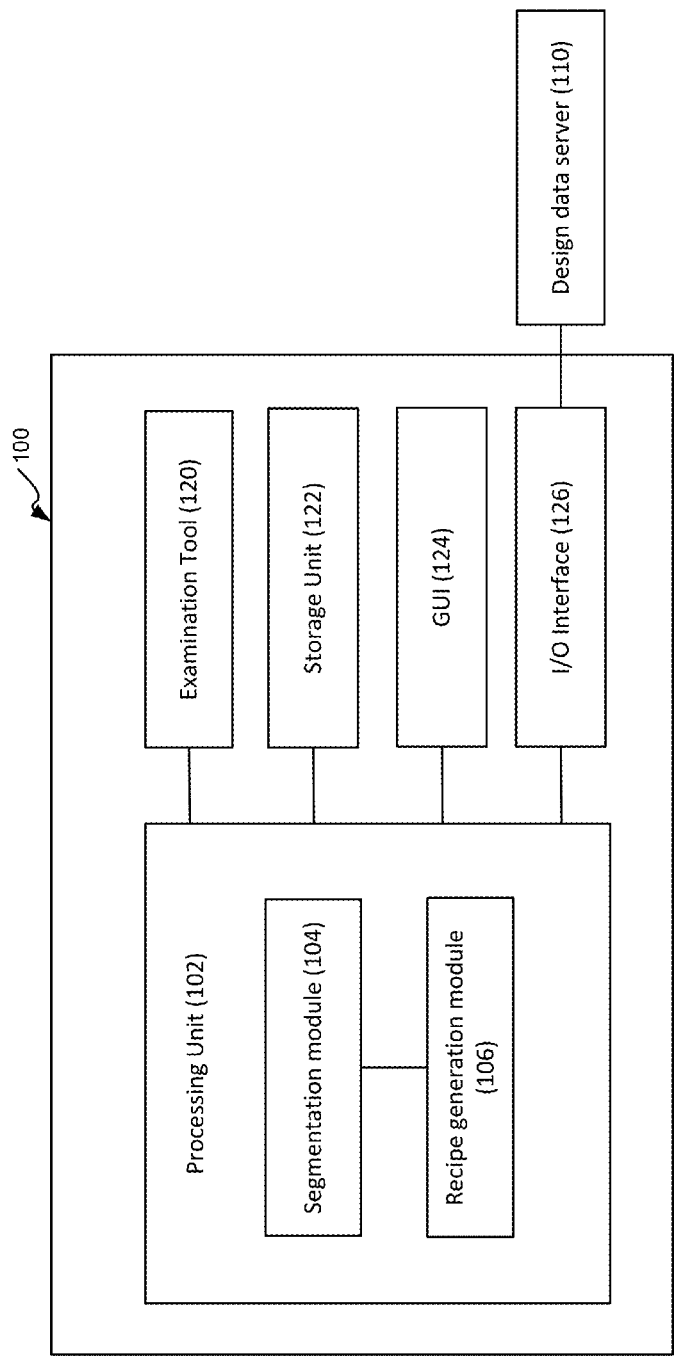
FIG. 1 illustrates a block diagram of a system of generating an examination recipe usable for examining a specimen in accordance with certain embodiments of the presently disclosed subject matter.

Bearing this in mind, attention is drawn to FIG. 1 illustrating a block diagram of a system of generating an examination recipe usable for examining a specimen in accordance with certain embodiments of the presently disclosed subject matter.

The system 100 illustrated in FIG. 1 can be used for generating an examination recipe usable for examining a specimen (e.g. of a wafer and/or parts thereof). As aforementioned, the term "specimen" used in this specification should be expansively construed to cover any kind of wafer, masks, reticles and other structures, combinations and/or parts thereof used for manufacturing semiconductor integrated circuits, magnetic heads, flat panel displays, and other semiconductor-fabricated articles. According to certain embodiments, the specimen used herein can be selected from a group comprising: a wafer, a reticle, a mask, an integrated circuit and a flat panel display (or at least a part thereof). It is to be noted that the term examination recipe should be expansively construed to cover any kind of recipe that can be used for examining a specimen, including recipe(s) for inspection, detection, classification as well as metrology related operations, etc.

System 100 can comprise one or more examination tools 120. The term "examination tools" used herein should be expansively construed to cover any tools that can be used in examination-related processes including, by way of non-limiting example, imaging, scanning (in a single or in multiple scans), sampling, reviewing, measuring, classifying and/or other processes provided with regard to the specimen or parts thereof. The one or more examination tools 120 can include one or more inspection tools and/or one or more review tools. In some cases, at least one of the examination tools 120 can be an inspection tool configured to scan an entire specimen (e.g., an entire wafer or at least an entire die) to capture inspection images (typically, at relatively high-speed and/or low-resolution) for detection of potential defects. In some cases, at least one of the examination tools 120 can be a review tool, which is configured to capture review images of at least part of defects detected by inspection tools for ascertaining whether a potential defect is indeed a defect. Such a review tool is usually configured to inspect fragments of a die, one at a time (typically, at relatively low-speed and/or high-resolution). Inspection tool and review tool can be different tools located at the same or at different locations, or a single tool operated in two different modes. In some cases at least one examination tool can have metrology capabilities.

Without limiting the scope of the disclosure in any way, it should also be noted that the examination tools 120 can be implemented as inspection machines of various types, such as optical imaging machines, electron beam inspection machines and so on.

According to certain embodiments, the examination tool 120 can be configured to capture one or more images from one or more dies of the specimen and obtain a noise map indicative of noise distribution on the one or more images. The images can be resulted from different examination modality(s), and the present disclosure is not limited by the inspection and metrology technology used for generating the images. In some embodiments, the examination tool 120 can be an inspection tool configured to scan the specimen with sensitive examination/scan configuration to capture the one or more images. In some cases, the captured images of the specimen can be processed (e.g., by an image processing module whose functionality can be either integrated within the examination tool 120 or within the processing unit 102, or implemented as a standalone computer) in order to generate a defect map indicative of suspected locations on the specimen having high probability of being a defect of interest (DOI), as will be described in further detail with respect to FIG. 2. In some embodiments, the defect map is obtained using a low detection threshold. Since the scanning is performed with a sensitive scan configuration and the detection is done using a low detection threshold, most of the suspected defects reflected in the defect map are more likely to be noise or false alarms. Therefore, the defect map is also referred to herein as a noise map (although the DOIs are also reflected therein, they are relatively rare as compared to the amount of noises).

The term "Defect of interest (DOI)" used herein refers to any real defects that are of the user's interest to be detected. For instance, any "killer" defects that may cause yield loss can be indicated as DOI, as in comparison to nuisance type of defects which are also real defects but do not impact yield and therefore should be ignored.

The term "noise" used herein should be expansively construed to include any unwanted or not-of-interest defects (also referred to as non-DOI, or nuisance), as well as random noises that are caused by different variations (e.g., process variation, color variation, mechanical and electrical variations, etc.) during inspection.

System 100 can be operatively connected to a Design data server 110 (e.g., CAD server) via a hardware-based I/O interface 126. The Design data server 110 is configured to store and provide design data characterizing the specimen. The design data of the specimen can be in any of the following formats: the physical design layout (e.g., CAD clip) of the specimen, a raster image and a simulated image derived from the design layout. According to certain embodiments, the I/O interface 126 can be configured to receive, from the design data server 110, design data of the one or more dies. The design data can be representative of a plurality of design groups/families each corresponding to one or more die regions having the same design pattern. In some cases, system 100 can be operatively connected to one or more external data repositories (not shown in FIG. 1) which are configured to store data (and/or derivatives thereof) produced by the examination tools 120 and/or the Design data server 110. The noise map, as well as the design data of the specimen, can be provided to a processing unit 102 for further processing, as will be described in detail below.

System 100 can comprise a processing unit 102 operatively connected to the I/O interface 126 and the examination tool 120. Processing unit 102 is a processing circuitry configured to provide all processing necessary for operating system 100 which is further detailed below with reference to FIG. 2. Processing unit 102 comprises a processor (not shown separately) and a memory (not shown separately). The processor of processing unit 102 can be configured to execute several functional modules in accordance with computer-readable instructions implemented on a non-transitory computer-readable memory comprised in the processing unit. Such functional modules are referred to hereinafter as comprised in the processing unit 102.

Functional modules comprised in the processing unit 102 can comprise a segmentation module 104, and a recipe generation module 106, which are operatively connected with each other. The segmentation module 104 can be configured to calculate a group score for each given design group. For calculating the group score, the noise map needs to be aligned with the design data such that each given design group of the plurality of design groups is associated with noise data within the die regions corresponding to the given design group. The group score can be calculated based on the noise data associated with the given design group and a defect budget allocated for the area of the given design group. The segmentation module 104 can be further configured to provide segmentation related to the one or more dies by: associating each given design group with one segmentation label of a predefined set of segmentation labels indicative of different noise levels based on the group score of the given design group, thereby obtaining a set of die segments each corresponding to one or more design groups associated with the same segmentation label and segmentation configuration data informative of the segmentation.

The recipe generation module 106 can be configured to generate an examination recipe using the segmentation configuration data. The examination recipe can be provided to the examination tool 120 and/or any other examination tools for examining one or more specimens in runtime using the segmentation configuration data. The segmentation configuration data which may comprise a segmentation layout can also be sent to the computer-based graphical user interface (GUI) 124 for rendering the results. The segmentation and recipe generation will be described below in further detail with reference to FIG. 2. In some cases, the recipe generation module 106 can be further configured to verify the examination recipe prior to using it in runtime examination.

According to certain embodiments, system 100 can comprise a storage unit 122. The storage unit 122 can be configured to store any data necessary for operating system 100, e.g., data related to input and output of system 100, as well as intermediate processing results generated by system 100. By way of example, the storage unit 122 can be configured to store images and/or derivatives thereof produced by the examination tool 120. Accordingly, the one or more images can be retrieved from the storage unit 122 and provided to the processing unit 102 for further processing. Additionally or alternatively, the storage unit 122 can be configured to store the design data of the specimen, which can be retrieved therefrom and provided to the processing unit 102 as input.

In some embodiments, system 100 can optionally comprise a computer-based Graphical user interface (GUI) 124 which is configured to enable user-specified inputs related to system 100. For instance, the user can be presented with a visual representation of the specimen (for example, by a display forming part of GUI 124), including design data and/or image data of the specimen. The user may be provided, through the GUI, with options of defining certain operation parameters. The user may also view the segmentation results as well as other operation results on the GUI.

It is to be noted that although it is illustrated in FIG. 1 the examination tool 120 is implemented as a part of system 100, in certain embodiments, the functionalities of system 100 can be implemented as stand-alone computer(s) and can be operatively connected to the examination tool 120 to operate in conjunction therewith. In such cases, the images of the specimen can be received, either directly or via one or more intermediate systems, from the examination tool 120, and can be provided to the processing unit 102 for further processing. In some embodiments, the respective functions of system 100 can, at least partly, be integrated with one or more examination tools 120 thereby facilitating and enhancing the functionalities of the examination tools 120 in examination related processes. In such cases, components of the system 100, or at least part thereof, may form part of the examination tool 120. By way of one example, the segmentation module 104 and/or the recipe generation module 106, can be implemented or integrated as part of the examination tools 120. By way of another example, processing unit 102 and storage unit 122 may form part of the processing unit and storage, respectively, of examination tool 120; and the I/O interface and GUI of the examination tool 120 may function as I/O interface 126 and GUI 124.

Those versed in the art will readily appreciate that the teachings of the presently disclosed subject matter are not bound by the system illustrated in FIG. 1; equivalent and/or modified functionality can be consolidated or divided in another manner and can be implemented in any appropriate combination of software with firmware and hardware.

It is noted that the system illustrated in FIG. 1 can be implemented in a distributed computing environment, in which the aforementioned functional modules shown in FIG. 1 can be distributed over several local and/or remote devices, and can be linked through a communication network. It is further noted that although the examination tool 120, storage unit 122, and GUI 124 are illustrated as being part of the system 100 in FIG. 1, in some other embodiments, at least part of the aforementioned units can be implemented as being external to system 100 and can be configured to operate in data communication with system 100 via I/O interface 126.

Figure 2:
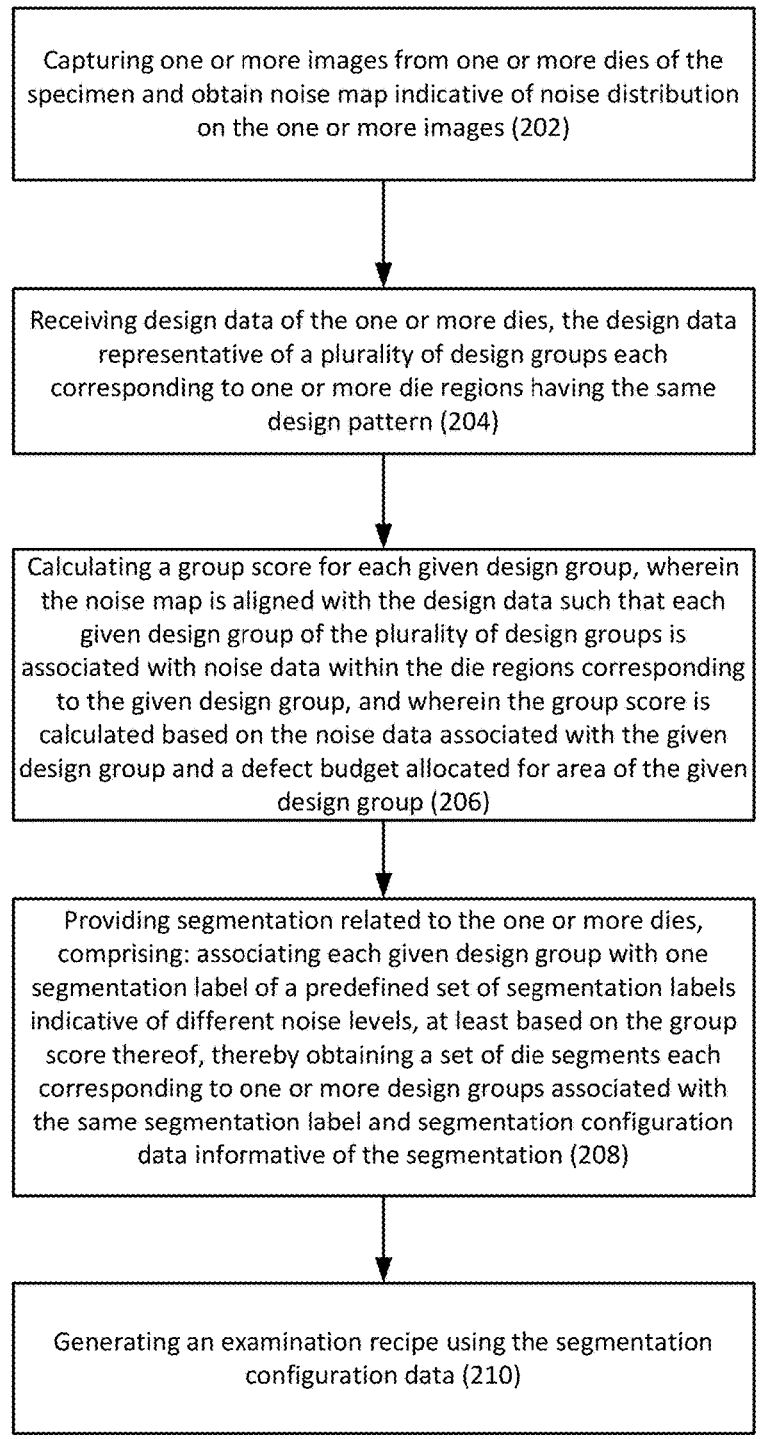
FIG. 2 illustrates a generalized flowchart of generating an examination recipe usable for examining a specimen in accordance with certain embodiments of the presently disclosed subject matter.

Referring now to FIG. 2, there is illustrated a generalized flowchart of generating an examination recipe usable for examining a specimen in accordance with certain embodiments of the presently disclosed subject matter.

For purpose of illustration only, certain embodiments of the following description are provided with respect to wafers. Embodiments are, likewise, applicable to other types, sizes and representations of specimen.

One or more images (also referred to as inspection images) can be captured (202) (e.g., by the examination tool 120) from one or more dies of the specimen and a noise map indicative of noise distribution on the one or more images can be obtained.

As aforementioned, the one or more images from one or more dies can be captured by an inspection tool which is configured to scan the specimen with sensitive scan configuration. The sensitive scan configuration of the examination tool can include configuring one or more of the following parameters: illumination conditions, polarization, noise level per area (the areas can be defined in various ways, such as, e.g., predefined based on user/customer information, or defined as related to design patterns, etc.), detection threshold per area, and noise strength calculation method per area, etc. The inspection tool is specifically configured with these sensitive parameters to enable a sensitive scan of the specimen such that more false alarm defects can be revealed during the scan and more information of the noise characteristics of the one or more dies can be collected.

According to certain embodiments, the noise map can be obtained based on the one or more inspection images using a low detection threshold. The usage of a low detection threshold enables more false alarms to be detected from the sensitive scan results during detection thereby resulting in more noise data to be collected for analyzing the noise levels of different die regions, as will be described below with reference to blocks 206 and 208.

The noise map can be generated (e.g., by a detection module and/or an image processing module whose functionality can be either integrated within the examination tool 120 or within the processing unit 102) in various ways. In some embodiments, the noise map can be generated by applying the detection threshold directly on pixel values of the captured inspection images. In some other embodiments, the inspection images of the specimen can be further processed in order to generate the noise map. Different inspection and detection methodologies can be applied for processing the inspection images and generating the defect map, and the present disclosure is not limited by specific detection technologies used therein. For illustrative purposes only, there are now described examples of defect detection and noise map generation based on the inspection images.

In some embodiments, for each inspection image, one or more reference images can be used for defect detection. The references images can be obtained in various ways, and the number of reference images used herein and the way of obtaining such images should not be construed to limit the present disclosure in any way. In some cases, the one or more reference images can be captured from one or more dies of the same specimen. In some other cases, the one or more reference images can include one or more images captured from one or more dies of another specimen (e.g., a second specimen that is different from the present specimen but shares the same design data). By way of example, in Die-to-History (D2H) inspection methodology, the inspection image can be captured from a present specimen at a present time (e.g., t=t'), and the one or more reference images can include one or more previous images captured from one or more dies on a second specimen at a baseline time (e.g., a previous time t=0). In some further embodiments, the one or more reference images can include at least one simulated image representing a given die of the one or more dies. By way of example, a simulated image can be generated based on design data (e.g., CAD data) of the die.

In some embodiments, at least one difference image can be generated based on difference between pixel values of the inspection image and pixel values derived from the one or more reference images. Optionally, at least one grade image can also be generated based on the at least one difference image. The grade image can be constituted by pixels with values computed based on corresponding pixel values in the difference image and a predefined difference normalization factor. The predefined difference normalization factor can be determined based on behavior of normal population of pixel values and can be used to normalize the pixel values of the difference image. By way of example, the grade of a pixel can be calculated as a ratio between a corresponding pixel value of the difference image and the predefined difference normalization factor. The noise map can be generated by determining locations of suspected defects (noises) based on the at least one difference image or the at least one grade image using a detection threshold.

In some cases, one inspection image from one die of the specimen can be captured and the defect detection as described above can be applied on such image to derive the noise map. In some other cases, a plurality of inspection images can be captured from a plurality of dies of the specimen. For each image, a respective defect detection process can be applied to derive a respective noise map. A final or composite noise map can be derived based on the plurality of noise maps, e.g., by averaging, or weighted averaging, or calculating median of the plurality of noise maps, or any other suitable approaches of deriving a composite or average image from multiple images. This composite noise map can be indicative of statistical noise distribution based on the statistical noise data collected from all the dies. This is also referred to as "die stacking" since noise data from multiple dies are "stacked" together to generate the composite noise map. In some cases, the plurality of inspection images can be captured from dies of the present specimen and/or another specimen.

The obtained noise map can be indicative of noise distribution on the one or more images. In some embodiments, the noise distribution can comprise one or more noise characteristics of the noises in the noise map as revealed by the detection process, such as, locations of the noises (e.g., on the inspection images). Additionally, the noise characteristics can further include at least one of the following: strength and size of the noises. In some embodiments, the noises in the noise map can comprise pattern-related noises. This type of noises relates to the local density and complexity of the design patterns to which the noises are associated with. There can also be other types of noises included in the noise map, such as noises caused by the examination tool (e.g., shot noise).

According to certain embodiments, the noises in the noise map can comprise planted defects (also termed as simulated defects or implanted defects or artificial defects). Planted defects are simulated profiles of defects which can be created based on prior knowledge of expected DOI profile. The prior knowledge of expected DOI can be obtained from one or more of the following: specific DOIs of a specific layer, the parameters of the inspection tool, or previously observed similar defects on the same or different specimens. A profile of a defect refers to defect characteristics such as, e.g., the spatial shape, amplitude and phase of the defect. In some cases, the simulated defects can be related to a specific pattern, for example, a line being wider or narrower than designed.

The simulated defects can be added to the inspection image before further processing of the image. The locations for the simulated defects on the inspection image can be random, or tied to a specific pattern or area of interest. The modified inspection image which includes defect information resulted from the scanning and the added simulated defects is then processed normally through the defect detection process, as described above. Since the locations of the planted defects are known in advance, defect information is generated for these locations, even if these defects are not actually detected during the detection process. For example, these defects can be artificially reported and marked as planted defects in the noise map, as will be described in detail below.

According to further embodiments, the noises in the noise map can also comprise of DOI information, which can be collected from a review tool or inspection tool, or based on prior knowledges. The DOI information can be added by identifying them in the inspection image according to the prior knowledge. These DOIs can be detected in a similar way as the planted defects, as described above.

Design data of the one or more dies can be received (204) (e.g., by the I/O interface 126, from the design data server 110). The design data is representative of a plurality of design groups each corresponding to one or more die regions having the same design pattern. In some embodiments, design data of a die can comprise various design patterns which are of specific geometrical structures and arrangements. A design pattern can be defined as composed of one or more structural elements each having a geometrical shape with a contour (e.g., one or more polygons). It is to be noted that design patterns can be deemed as "the same" either when they are identical or when they are highly correlated or similar to each other. Various similarity measures and algorithms can be applied for matching and clustering similar design patterns, and the present disclosure should not be construed to be limited by any specific measures used for deriving the design groups.

In some embodiments, the clustering of design groups can be performed beforehand and design group information can be pre-stored in the design data server 110. In some cases, the design data as received in block 204 can only include the grouping information (e.g., design coordinates of different design groups) without the physical design layout (e.g., CAD clip) information. In some other cases, the design data as received in block 204 can include both the grouping information and specific design layout information. In some embodiments, the clustering of design groups can be performed by the processing unit 102 of system 100 upon receiving the physical design layout of the die from the design data server.

Figure 3:
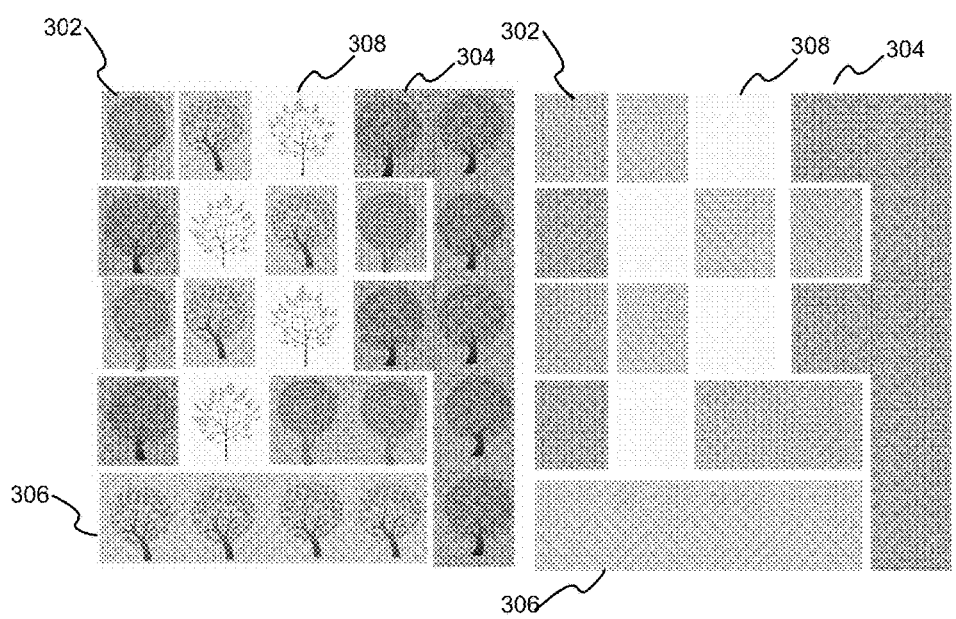
FIG. 3 illustrates a schematic example of design groups in accordance with certain embodiments of the presently disclosed subject matter.

Referring now to FIG. 3, there is illustrated a schematic example of design groups in accordance with certain embodiments of the presently disclosed subject matter.

For illustrative purposes only, design data of a die (or part thereof) is schematically shown in FIG. 3. Different kinds of "trees" represent different design patterns on the design data. After clustering/grouping similar design patterns, the design data is divided into four design groups 302, 304, 306, and 308 each corresponding to one or more die regions having the same design pattern. It is to be noted that in some design groups, the design patterns are not exactly the same or identical but rather with high similarity. For example, in design group 304, it can be seen that the pattern in the two regions on the left and the pattern in the regions on the right are slightly different (e.g., in opposite direction). As aforementioned, in some cases, the design data as received in block 204 can be in the form of the left representation in FIG. 3, which comprises the grouping information as well as the specific design layouts and patterns. In some cases, it can be in the form of the right representation in FIG. 3, which comprises only the grouping information (e.g., the locations of the groups in design coordinates).

It is to be noted that the example shown in FIG. 3 is only for illustrative purposes and should not be deemed to limit the present disclosure in any way. Any one skilled in the art would readily appreciate that the actual design patterns of a die can be much more complex, therefore the grouping of similar design patterns can be much more complicated than the present example.

According to certain embodiments, the inputs of the noise map obtained in block 202 and the design data received in block 204 need to be aligned such that each given design group of the plurality of design groups can be associated with noise data within the die regions corresponding to the given design group. In some cases, the noise map and design data can be aligned beforehand, e.g., by a different system, and the aligned inputs can be received by system 100 for further processing. In some other cases, the alignment can be performed by the processing unit 102 by registering the design data with the noise map. The registration process can be implemented according to any suitable registration algorithms known in the art (e.g. as described in US2007/0280527, US2013/204569 etc.)

By way of example, the noise map, which is in inspection coordinates, can be registered with the design data (e.g., a CAD clip) thereby obtaining for the design data coordinates in inspection space (coordinates in inspection space are referred to as inspection coordinates). Some differences between the inspection coordinates of the noise map and the corresponding locations in design coordinates are likely to occur for various reasons—scanning conditions (e.g. illumination) as well as imperfections, shifts and outright errors in the scanning process, errors in the manufacturing of the electric circuit printed on the wafer, and so forth. Position calibration data can be generated informative of a global (e.g. average) offset between the noise map and design data and/or of multiple offsets, each related to a specific region or pattern or object of interest thereof. Optionally, the position calibration data can comprise a data structure specifying respective offsets for each object of interest (or groups thereof). The position calibration data can be stored in the memory as comprised in the processing unit 102 or the storage unit 122.

Figure 4:
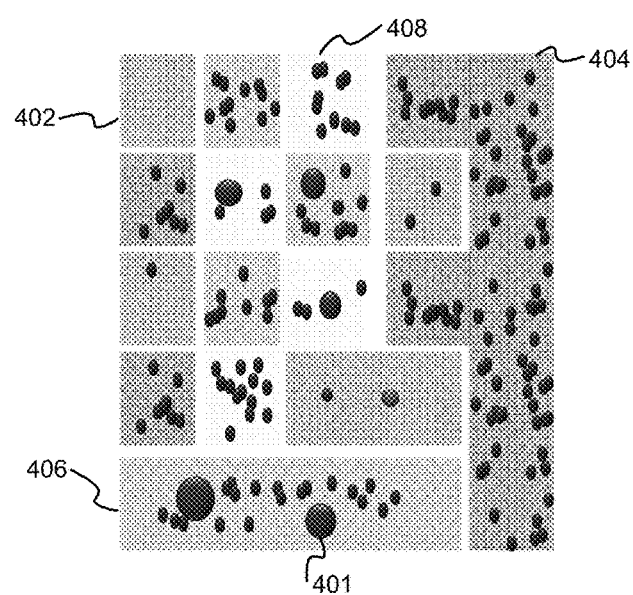
FIG. 4 illustrates a schematic example of aligned noise map and design data in accordance with certain embodiments of the presently disclosed subject matter.

Referring now to FIG. 4, there is illustrated a schematic example of aligned noise map and design data in accordance with certain embodiments of the presently disclosed subject matter.

Using the registration algorithm as described above, the design groups as derived in FIG. 3 are aligned with a noise map. Noises in the noise map are illustrated in FIG. 4 as black dots 401 located in different positions with different sizes. The sizes can be indicative of the strength of the noise signals or the actual spatial sizes of the noises. For instance, as described above in the detection process, if the noise map is generated based on a grade image and a detection threshold, the strength of a noise in the noise map can be represented by pixel value(s) corresponding to the noise in the grade image. After alignment, the four design groups 302, 304, 306, and 308 are associated with noise data (e.g., represented by the black dots) falling within the die regions respectively corresponding to the design groups. The aligned design groups with associated noise data thereof are marked as 402, 404, 406, and 408 which are provided as inputs for further processing described below with reference to blocks 206 and 208. In some cases, after alignment, the aligned design groups with noise data can be in inspection coordinates.

Continuing with the description of FIG. 2, a group score can be calculated (206) (e.g., by the segmentation module 104) for each given design group based on the noise data associated with the given design group and a defect budget allocated for area of the given design group. According to certain embodiments, a total defect budget is allocated for the entire die. The total defect budget refers to the total amount of desired false alarms that is expected to be detected after the inspection and detection process. Under the assumption that the DOIs have uniform distribution on the die, the total defect budget for the entire die can be divided and allocated to the plurality of design groups of the die, e.g., according to area of the design groups (i.e., size of the die regions corresponding to each design group). For instance, the defect budget allocated for a given design group can be calculated as a product of the total defect budget for the entire die and a ratio of the area of the given design group to the area of the entire die.

In some embodiments, a noise histogram can be created for a given design group based on the noise data associated with the given group. The group score for the given design group can be calculated as a threshold by applying the defect budget allocated for that given design group on the noise histogram of that group. By way of example, a noise histogram can be created as the count of pixels (y axis) versus pixel values in the noise map indicating the strength (e.g., the grade) of the noises/defects (x axis). By applying the allocated defect budget to the histogram, a threshold can be derived separating the amount of suspected DOIs that equals to the defect budget from the rest. This threshold can be used as the group score for the given design group.

It is to be noted that the above described is only one possible way of calculating the group score, and other suitable methods can be applied in lieu of or in addition to the above. By way of example, the group score can be calculated as the noise density in the given group. The noise density can be calculated, e.g., as a ratio of the amount of noises associated with the given design group to the area of the design group. By way of another example, the group score can be derived based on the maximum/minimum pixel values as indicated in the noise map.

In some cases, there can be overlapping between different design groups. This can be caused, e.g., due to overlapping spatial relationship between certain structures in different layers of the specimen. Therefore, once the noise map is aligned with design data, the noise data that falls within the overlapping area between different design groups need to be considered when associating noise data with design groups, or when calculating the group score for the design groups. By way of example, the noise data located in the overlapping area between two (or more) design groups should only be counted once within one design group, therefore it is needed to decide which design group this noise data actually belongs to and exclude them from the other overlapped group(s), e.g., when calculating the group score for such group(s).

Once the group score is calculated for each design group, segmentation related to the one or more dies can be performed/provided (208) (e.g., by the segmentation module 104). The segmentation can be performed by associating/assigning each given design group with one segmentation label of a predefined set of segmentation labels indicative of different noise levels based on the group score of the given design group, thereby obtaining a set of die segments each corresponding to one or more design groups associated with the same segmentation label and segmentation configuration data informative of the segmentation. In some cases, a segmentation layout of the die can be generated indicating the set of die segments resulted from the segmentation (e.g., in inspection coordinates), and the segmentation configuration data can comprise the segmentation layout.

In some embodiments, for performing the association between the design groups and the segmentation labels, the design groups can be ranked according to their group scores, and the ranked design groups can be divided into the predefined set of segments based on their ranking. By way of example, the predefined set of segmentation labels can include three labels indicative of noise levels of quiet, noisy and very noisy. Per the segmentation, each design group can be labeled as one of quiet region, noisy region and very noisy region. It is to be noted that the present disclosure is not limited by the number of segmentation labels as predefined in the set.

An examination recipe can be generated (210) (e.g., by the recipe generation module 106) using the segmentation configuration data. The examination recipe can be used by the examination tool 120 and/or any other examination tools for examining one or more specimens in runtime using the segmentation configuration data therein. The segmentation layout can also be sent to the GUI 124 for rendering the results to the users.

According to certain embodiments, the generated examination recipe can be verified prior to be used in runtime examination. In such cases, the examination tool 120 can be configured to capture one or more test images of the specimen and perform defect detection using the examination recipe, thereby to decide whether to accept or refine the examination recipe.

The segmentation configuration data can be used in various ways during runtime examination. By way of example, the segmentation configuration data can be used to configure a detection threshold for each die segment. For instance, the die segment labeled as very noisy can have a higher threshold as compared to the die segment labeled as quiet. By way of another example, the segmentation configuration data can be used to configure the calculation of a difference image and/or a grade image. For instance, the pixel values in the difference image and/or grade image can be normalized or adapted according to the noise levels of different segments.

Figure 5:
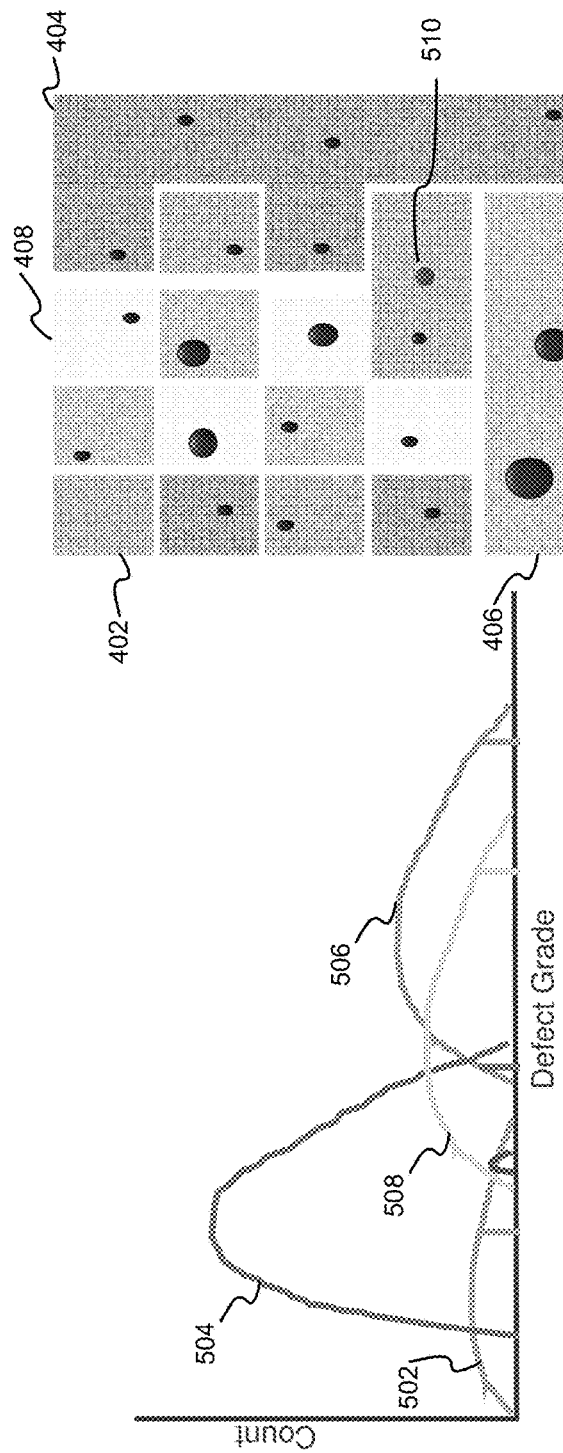
FIG. 5 illustrates an example of using the segmentation configuration data in runtime examination in accordance with certain embodiments of the presently disclosed subject matter.

Referring now to FIG. 5, there is now illustrated an example of using the segmentation configuration data in runtime examination in accordance with certain embodiments of the presently disclosed subject matter.

Continuing with the example illustrated in FIG. 3 and FIG. 4, assuming that per segmentation, the design groups 402, 404, 406, and 408 are assigned as four die segments of very quiet, quiet, very noisy and noisy. During runtime examination, this segmentation data is used and instead of generating one noise histogram for the entire die, for each die segment, a noise histogram has been created. As shown on the left graph of FIG. 5, there are illustrated four histograms 502, 504, 506, and 508 created respectively for the four die segments 402, 404, 406, and 408. Different detection thresholds have been assigned for the four histograms. The detection thresholds can be calculated in a similar manner as described above with reference to block 206. In the example of FIG. 5, die segments 406 and 408 are relatively noisier than die segments 402 and 404 as illustrated in the histograms, therefore higher thresholds have been applied to segments 406 and 408, and lower thresholds have been applied to segments 402 and 404. By applying different thresholds, different detection sensitivities can be achieved for die segments having different noise levels, thereby improving the overall detection sensitivity and defect detection rate. The detection results are illustrated on the right graph in FIG. 5. Particularly, in the present example, a DOI 510 in a very quiet segment 402 has been detected, since a relatively low threshold has been applied in this segment, whereas in the original detection process without the segmentation, this DOI would not have been detected, since the strength (e.g., the grade) of this DOI is relatively low as compared to noises in other noisy segments.

In the case where the noises in the noise map include planted defects, as aforementioned, since the locations of the planted defects are known in advance, these defects can be artificially reported and marked as planted defects in the noise map. By way of example, the pixel values indicative of the planted defects in the noise map can be calculated based on the artificially reported strength of the planted defects and the original pixel values at the location of the planted defects in the inspection images. The group scores of design groups in which there are noise information related to planted defects are therefore calculated taking into account of these additional noise information, thereby affecting the ranking of noise levels of such groups. In one embodiment, the planted defects can be added to the one or more images in predefined locations associated with a design pattern of interest (POI), and the group score of a given design group comprising the design POI can be calculated based on the information of planted defects, in a similar way as described above with reference to block 206. In such cases, the determination of noise levels as described with reference to block 208 can be further based on the information of planted defects. For example, if the same planted defect has been detected with different noise strength (e.g., grades) in different locations, an indication can be derived that these different locations have different noise levels.

One advantage of injecting planted defects and/or DOI information is the ability to designate design groups in regions of interest in the die and generate enough statistics where it is needed (e.g., in places where there are normally no defects), thereby creating a very high resolution of design groups.

It is also noted that whilst the flow charts illustrated in in FIG. 2 are described with reference to elements of system 100, this is by no means binding, and the operations can be performed by elements other than those described herein.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable storage medium tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A computerized system of generating an examination recipe usable for examining a specimen, the system comprising:
   an examination tool configured to capture one or more images from one or more dies of the specimen and obtain a noise map indicative of noise distribution on the one or more images;
   an I/O interface configured to receive design data of the one or more dies, the design data representative of a plurality of design groups each corresponding to one or more die regions having a same design pattern; and
   a processing unit operatively connected to the examination tool and the I/O interface, the processing unit comprising a memory and a processor operatively coupled thereto, wherein the processing unit is configured to:
      calculate a group score for each design group of the plurality of design groups, wherein the noise map is aligned with the design data such that each design group of the plurality of design groups is associated with noise data within one or more corresponding die regions, and wherein a group score of a given design group of the plurality of design groups is calculated based on the noise data associated with the given design group and a defect budget allocated for an area of the given design group;
      provide segmentation related to the one or more dies by associating each design group with one segmentation label of a predefined set of segmentation labels indicative of different noise levels based on the group score calculated therefor, thereby obtaining a set of die segments each corresponding to one or more design groups associated with the same segmentation label and segmentation configuration data informative of the segmentation; and
      generate an examination recipe using the segmentation configuration data.

2. The computerized system according to claim 1, wherein the processing unit is further configured to register the design data with the noise map such that the noise map is aligned with the design data.

3. The computerized system according to claim 1, wherein the noise map is indicative of statistical noise distribution on a plurality of images captured from a plurality of dies of at least the specimen.

4. The computerized system according to claim 1, wherein the noise distribution comprises one or more noise characteristics of noises indicated in the noise map including locations of the noises.

5. The computerized system according to claim 1, wherein the noise distribution comprises one or more noise characteristics of noises indicated in the noise map including locations of the noises and at least one of the following: strength and size of the noises.

6. The computerized system according to claim 1, wherein noises indicated in the noise map comprise pattern-related noise.

7. The computerized system according to claim 1, wherein the noise map comprises information related to planted defects, the planted defects being simulated defects added to the one or more images in predefined locations associated with a design pattern of interest (POI), and wherein the group score of the given design group comprising the design POI is calculated based on the information of planted defects.

8. The computerized system according to claim 1, wherein the examination tool is an inspection tool configured to scan the specimen to capture the one or more images with sensitive examination configuration and wherein the noise map is obtained using a low detection threshold.

9. The computerized system according to claim 1, wherein the group score is a threshold calculated by applying the defect budget allocated for the given design group on a noise histogram created based on the noise data associated with the given design group.

10. The computerized system according to claim 1, wherein the calculating is further based on overlapping between the plurality of design groups.

11. The computerized system according to claim 1, wherein the predefined set of segmentation labels are indicative of noise levels of quiet, noisy and very noisy.

12. The computerized system according to claim 1, wherein the segmentation configuration data is used to configure a detection threshold for each die segment.

13. A computerized method of generating an examination recipe usable for examining a specimen, the method comprising:
    capturing, by an examination tool, one or more images from one or more dies of the specimen and obtaining a noise map indicative of noise distribution on the one or more images;
    receiving, by an I/O interface, design data of the one or more dies, the design data representative of a plurality of design groups each corresponding to one or more die regions having a same design pattern;
    calculating, by a processing unit operatively connected to the inspection unit and the I/O interface, a group score for each design group of the plurality of design groups, wherein the noise map is aligned with the design data such that each design group of the plurality of design groups is associated with noise data within one or more corresponding die regions, and wherein group score of a given design group of the plurality of design groups is calculated based on the noise data associated with the given design group and a defect budget allocated for an area of the given design group;
    providing, by the processing unit, segmentation related to the one or more dies by associating each design group with one segmentation label of a predefined set of segmentation labels indicative of different noise levels based on the group score calculated therefor, thereby obtaining a set of die segments each corresponding to one or more design groups associated with the same segmentation label and segmentation configuration data informative of the segmentation; and
    generating, by the processing unit, an examination recipe using the segmentation configuration data.

14. The computerized method of claim 13, wherein the examination tool is an inspection tool and the one or more images are captured by the inspection tool with sensitive examination configuration, and wherein the noise map is obtained using a low detection threshold.

15. The computerized method of claim 13, wherein the noise map comprises information related to planted defects, the planted defects being simulated defects added to the one or more images in predefined locations associated with a design pattern of interest (POI), and wherein the group score of the given design group comprising the design POI is calculated based on the information of planted defects.

16. The computerized method of claim 13, wherein the group score is a threshold calculated by applying the defect budget allocated for the given design group on a noise histogram created based on the noise data associated with the given design group.

17. The computerized method of claim 13, wherein the associating is further based on overlapping between the plurality of design groups.

18. A non-transitory computer readable storage medium comprising instructions that, when executed by a processor, cause the processor to perform operations to generate an examination recipe usable for examining a specimen, the operations comprising:
    obtaining one or more images from one or more dies of the specimen and obtaining a noise map indicative of noise distribution on the one or more images;
    receiving design data of the one or more dies, the design data representative of a plurality of design groups each corresponding to one or more die regions having a same design pattern;
    calculating a group score for each design group of the plurality of design groups, wherein the noise map is aligned with the design data such that each design group of the plurality of design groups is associated with noise data within one or more corresponding die regions, and wherein group score of a given design group of the plurality of design groups is calculated based on the noise data associated with the given design group and a defect budget allocated for an area of the given design group;
    providing segmentation related to the one or more dies by associating each design group with one segmentation label of a predefined set of segmentation labels indicative of different noise levels based on the group score calculated therefor, thereby obtaining a set of die segments each corresponding to one or more design groups associated with the same segmentation label and segmentation configuration data informative of the segmentation; and
    generating an examination recipe using the segmentation configuration data.

19. The non-transitory computer readable storage medium of claim 18, wherein the noise map comprises information related to planted defects, the planted defects being simulated defects added to the one or more images in predefined locations associated with a design pattern of interest (POI), and wherein the group score of the given design group comprising the design POI is calculated based on the information of planted defects.

20. The non-transitory computer readable storage medium of claim 18, wherein the group score is a threshold calculated by applying the defect budget allocated for the given design group on a noise histogram created based on the noise data associated with the given design group.

* * * * *